US012571532B2

(12) United States Patent
Gantz et al.

(10) Patent No.: US 12,571,532 B2
(45) Date of Patent: Mar. 10, 2026

(54) COMBINED WEARABLE LAW ENFORCEMENT PATROL LIGHT AND SIGNAL DEVICE AND KIT

(71) Applicant: Ubavu Corporation, Boulder, CO (US)

(72) Inventors: Christopher Gantz, Northbrook, IL (US); Russ Knize, St Charles, IL (US); Mark Tarnowski, Sebastian, FL (US); Ron Theis, Kewaskum, WI (US); Kevin Gantz, Laguna Beach, CA (US)

(73) Assignee: Ubavu Corporation, Boulder, CO (US)

( * ) Notice: Subject to any disclaimer, the term of this patent is extended or adjusted under 35 U.S.C. 154(b) by 0 days.

(21) Appl. No.: 18/778,608

(22) Filed: Jul. 19, 2024

(65) Prior Publication Data

US 2025/0052413 A1 Feb. 13, 2025

Related U.S. Application Data

(60) Provisional application No. 63/527,916, filed on Jul. 20, 2023.

(51) Int. Cl.
| | |
|---|---|
| *F21W 111/00* | (2018.01) |
| *F21V 23/04* | (2006.01) |
| *F21V 33/00* | (2006.01) |
| *F41H 1/02* | (2006.01) |
| *H04N 7/18* | (2006.01) |
| *F21Y 113/10* | (2016.01) |

(52) U.S. Cl.
CPC .......... *F21V 33/0064* (2013.01); *F21V 23/04* (2013.01); *F41H 1/02* (2013.01); *H04N 7/185* (2013.01); *F21W 2111/00* (2013.01); *F21Y 2113/10* (2016.08)

(58) Field of Classification Search
CPC . F21V 33/0064; F21V 23/04; F21W 2111/00; F41H 5/08
See application file for complete search history.

(56) References Cited

U.S. PATENT DOCUMENTS

| | | | | |
|---|---|---|---|---|
| 11,519,699 B1 * | 12/2022 | Kissinger | ................ | F21V 23/04 |
| 2009/0284957 A1 * | 11/2009 | Shemwell | ............... | F41H 13/00 |
| | | | | 362/109 |
| 2010/0083820 A1 * | 4/2010 | Doyner | .................... | F41H 5/08 |
| | | | | 89/36.02 |

(Continued)

FOREIGN PATENT DOCUMENTS

| | | | | |
|---|---|---|---|---|
| WO | WO-2022124894 A1 * | 6/2022 | ............... | F41H 5/08 |

*Primary Examiner* — Tajash D Patel
(74) *Attorney, Agent, or Firm* — Rockman, Videobeck & O'Connor LLC; Howard B. Rockman

(57) ABSTRACT

A wearable law enforcement patrol light and signal device including a housing to be worn by a law enforcement patrol officer on a bulletproof vest or on an arm. A high intensity light source is mounted in a front plate of the housing, the high intensity light source electrically connected to a source of electric power in the housing. A switch activates and deactivates the high intensity light source, or the high intensity light source may automatically deactivate. The high intensity light source emits an alternating burst of light of at least five thousand lumens outward when the high intensity light source is activated. The housing of the device also supports a plurality of warning lights, identification badging, a communication system, and other features in a single housing that a patrol officer would normally wear as independent elements.

18 Claims, 8 Drawing Sheets

(56) References Cited

U.S. PATENT DOCUMENTS

| | | | |
|---|---|---|---|
| 2010/0313328 A1* | 12/2010 | Shelton | A41D 13/01 |
| | | | 2/243.1 |
| 2011/0226123 A1* | 9/2011 | Priebe | F41H 5/08 |
| | | | 89/36.02 |
| 2015/0016095 A1* | 1/2015 | Kretzu | A41D 13/01 |
| | | | 362/108 |
| 2015/0233679 A1* | 8/2015 | Seabrook | F41A 27/10 |
| | | | 89/36.07 |
| 2017/0268854 A1* | 9/2017 | Spransy | F41H 5/08 |
| 2017/0307339 A1* | 10/2017 | Bahu | H04N 23/23 |
| 2019/0104777 A1* | 4/2019 | Lauf | G08B 5/004 |
| 2019/0384556 A1* | 12/2019 | De Backer | A41D 1/005 |
| 2025/0052544 A1* | 2/2025 | Oostvogel | F41H 5/08 |

* cited by examiner

⊘ DL Defense
◉ Red Blue XXXX
○ Off

COMBINED WEARABLE LAW ENFORCEMENT PATROL LIGHT AND SIGNAL DEVICE AND KIT

This application claims priority to provisional application Ser. No. 63/527,916, entitled "Patrol Light," filed Jul. 20, 2023, to the extent allowed by law.

BACKGROUND OF THE INVENTION

The present invention relates to a multi-function utility device configured to be worn by law enforcement officers while on patrol, or mounted on moving vehicles. More specifically, the present invention is a utility device including several warning lights, cameras, sensors, communications and other features to be worn by law enforcement officers on patrol.

Law enforcement officers of many security organizations are required to wear or carry several independent devices on their body that enable them to identify and react to security incidents of all kinds in quick fashion. A few of these devices include lights, cameras, communication microphone and speaker, night vision scope, and the like. Providing all such devices individually to a patrol officer can be quite cumbersome, and add to the weight of the devices the patrol officer must carry on his/her body. At present, it is estimated that a patrol officer would be required to carry up to approximately fifteen individual devices. Each of such devices require storage or mounting in a bag or on a belt, and require handling each device individually, sometimes preventing immediate access to the needed devices which in some instances may be critical.

An object of the present invention is to provide a single wearable device that incorporates warning lights, cameras, sensors, communication devices, and defensive weapons for use by law enforcement personnel only. The presently disclosed device is adapted to be worn on the human body, and in addition can be mounted on moving vehicles such as cars, motorcycles, bicycles and boats, and is particularly configured to provide immediate access to one or more of the several components.

The presently disclosed device also includes elements that are not presently available to law enforcement officers, namely a long-range wearable light and a defensive weapon light.

BRIEF DESCRIPTION OF THE DRAWINGS

The description herein makes reference to the accompanying drawings, wherein like reference numerals refer to like parts throughout the several views, and wherein.

DETAILED DESCRIPTION OF THE ILLUSTRATED EMBODIMENTS

Figure 1:
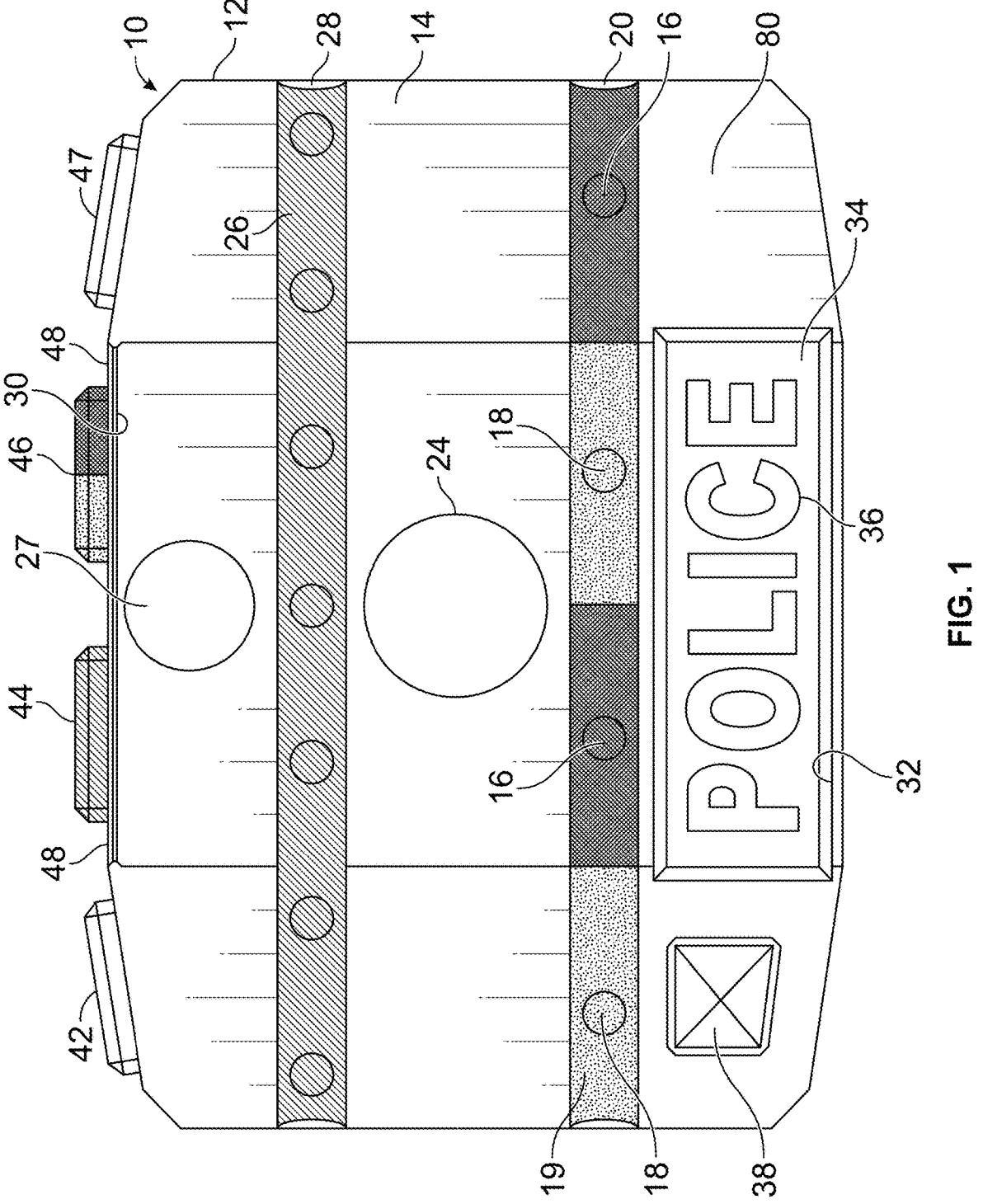
FIG. 1 is a front elevation view of an embodiment of the combined wearable law enforcement light and signal device and kit of the present invention.

Referring to FIG. 1, the combined wearable law enforcement light and signal device and kit 10 comprises a housing 12 having a front plate 14. Housing 12 and front plate 14 may be constructed of a bulletproof mesh material, such as sold under the Kevlar® brand. In the illustrated embodiment, bulletproof housing 12 and front plate 14 can also be made of a metal resin material. Alternating red and blue patterned or prismed officer warning emergency strobe lights 16, 18 are mounted in grooves 20 of front plate 14. Warning strobe lights 16, 18 are prismed to enable light emitted from the warning lights 16, 18 to be cast over a one hundred eighty degree arc from housing 12. Lights 16, 18 strobe and flash in motion sequences to provide a warning to those in the area.

Mounted on front plate 14 above warning lights 16, 18 is a high intensity confrontation or defense light source 24. In the illustrated embodiment, light source 24, when activated, emits a burst of a disabling ultra-bright-constant light, or ultra-high-frequency strobe light, for the purpose of temporarily blinding and disabling a bad actor or an animal approaching the law enforcement officer who is wearing device 10 adjacent to the officer's chest, and standing within the projected beam of light. The light beam is in the range of 5,000 lumens or brighter, rendering humans and animals defenseless due to the temporary reduction or elimination of normal vision for the period of time necessary for the restoration of vision, typically thirty seconds up to five minutes. The light beam cast from light source 24 also acts as a long range spotlight that projects a white beam of light for great distances, such as one mile from the device. In the illustrated embodiment, light source 24 comprises a laser excited phosphor (LEP) device.

Also mounted on front plate 14 is a strip 26 of yellow and/or white patterned flashing strobe lights mounted in groove 28. Light strip 26, comprises a plurality of light sources that strobe and flash in motion sequences to serve as a warning to people and vehicles within the area of the patrol officer wearing the device 10.

Located above light strip 26 on front plate 14 is a medium range spotlight beam 27 comprising a high intensity LED that projects a light beam forward in the range of twenty five to three hundred feet forward from device 10.

Front plate 14 also could include a vision protection visor 30 extending forward from the front plate 14, and extending over the lights 16, 18, 24, 26 and 27. Vision protection visor 30 shields the eyes of the patrol officer wearing device 10 from the intense light projection from lights 16, 18, 24, 26 and 27 beneath the visor 30.

Just below lights 16, 18 on front plate 14 is a back-lit organization identification badging insert 34 that is slightly moveable forward and rearward relative to the front plate 14. Beneath badging insert 34 is a spring-loaded switch electrically connected to defensive light source 24. When badging insert 34 is manually depressed, defensive light source 24 is activated. Depressing badging insert 34 a second time will deactivate defensive light source 24, or alternately, defensive light 24 can be configured to automatically deactivate after a predetermined period of time, such as in the range of three to ten seconds, for example.

Figure 4:
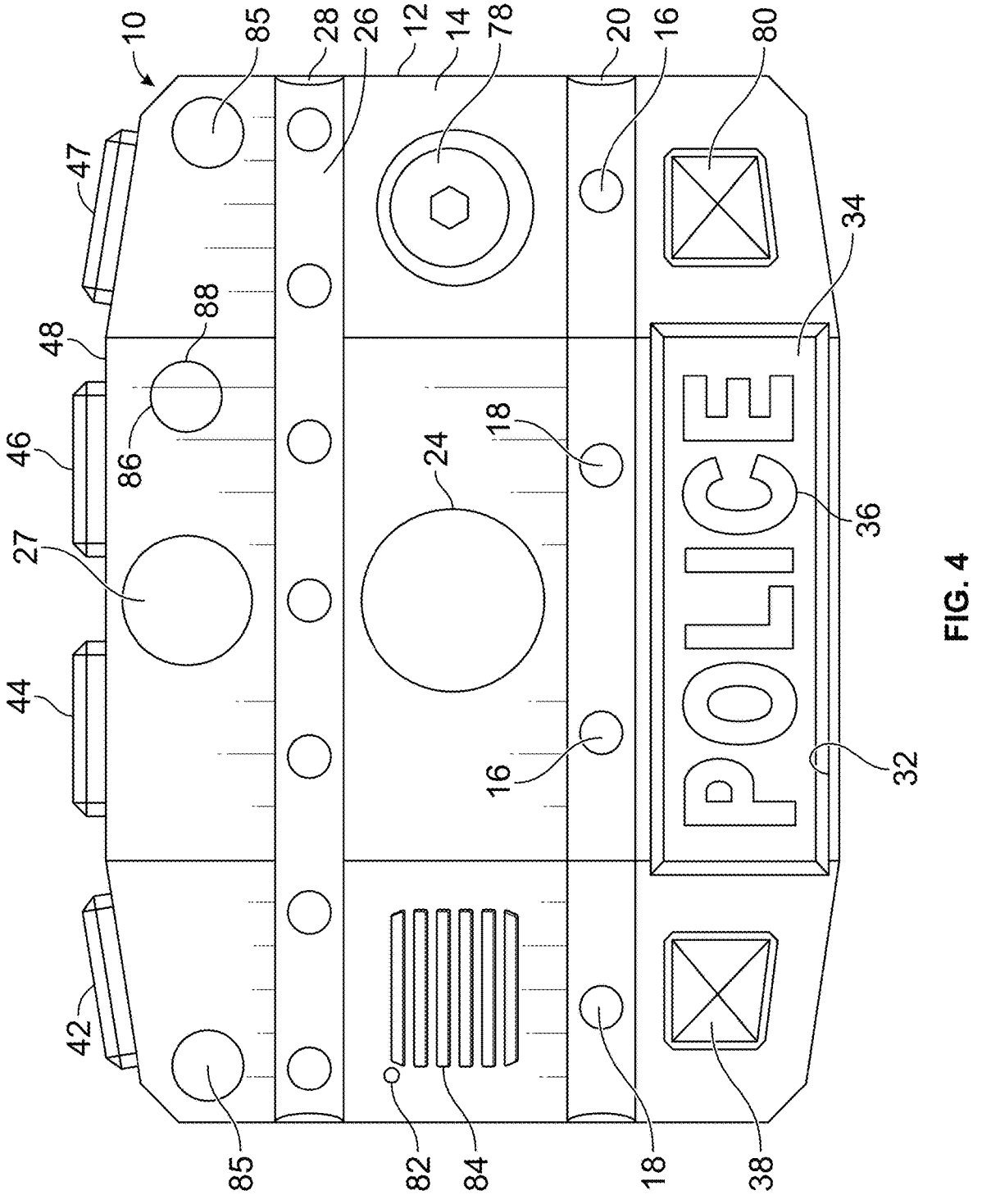
FIG. 4 is a schematic front view of the embodiment illustrated in FIG. 3.

As seen in the embodiment of FIG. 4, badging insert 34 identifies the wearer as a "POLICE" officer. However, other insertable and removable badging inserts 34 may identify other agencies of which the wearer is a member, such as "FBI," "HOMELAND SECURITY," and the like. The alphanumeric text or numeral integers 36 comprising badging insert 34 are made of translucent plastic or other suitable material and the badging insert text 36 is backlit via lighting built into housing 12. Illumination of badging insert 34 is controlled by manually operated on-off switch 38 located in housing 12 adjacent badging insert 34.

Figure 2:
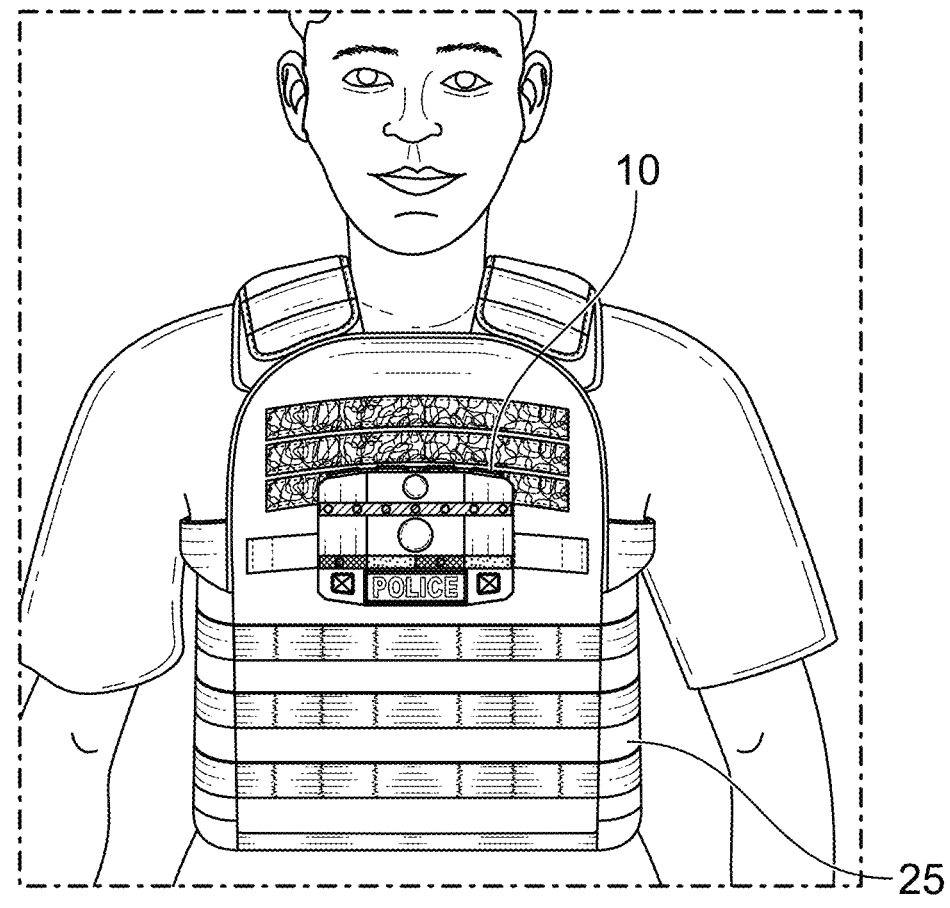
FIG. 2 is a front elevation view of the device of FIG. 1 attached to a bulletproof vest to be worn by a law enforcement officer while on patrol.

FIG. 2 illustrates a bulletproof vest 25 with the device 10 mounted on vest 12 about chest high. Vest 12 comprises a front and back fabric including a bulletproof metal resin housing that prevents bullets and other projectiles from passing through the vest 25.

Figure 9:
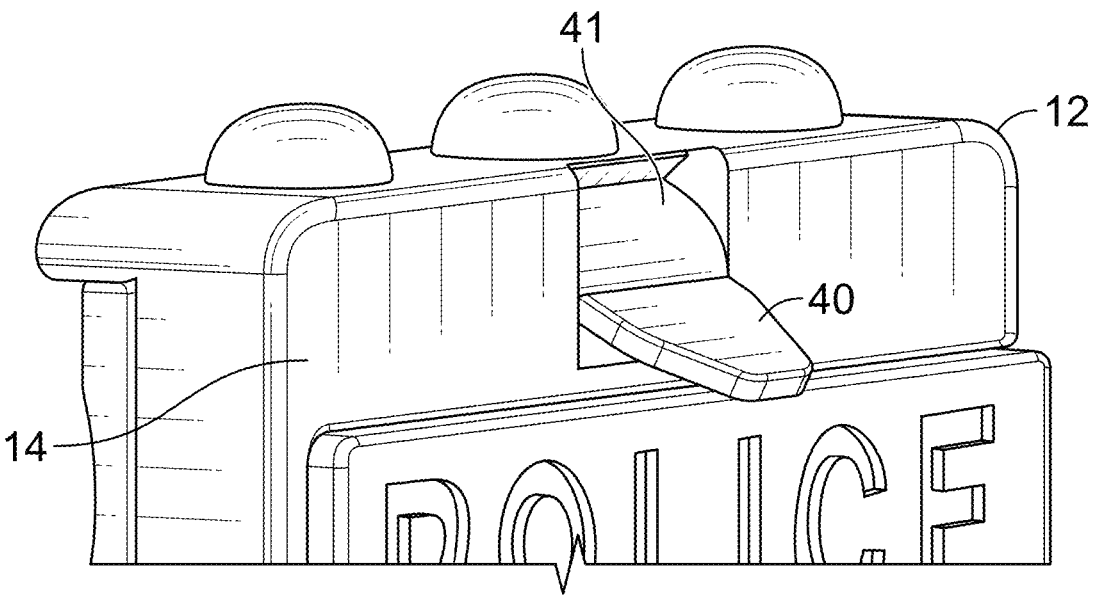
FIG. 9 is a detail view of a light dimming switch mounted on the housing of the embodiments of FIGS. 1-4.

Referring to FIG. 9, a quick access manually operable dimmer switch 40 is pivotally mounted at 41 to housing 12. By rotating dimmer switch 40 downward, the intensity of all of the lights 16, 18, 24, 26 and 27 mounted on front plate 14 is lowered. When dimmer switch 40 is raised, the intensity of the aforesaid lights increases.

Referring to FIGS. 1, 3, 4, and 7, a plurality of easy to access light activation membrane switches 42, 44, 46, 47 are mounted on the top surface 48 of housing 12. Each switch 42, 44, 46, 47 is depressible and returns to its original position after manual activation. Switch 42, when depressed, activates spotlight beam 27. Switch 44, when depressed, activates yellow caution light strips 26. Switch 46, when depressed, activates officer warning red and blue lights 16, 18. Switch 47, when depressed, turns off all of the aforementioned light sources. After activation, depression of any of buttons 42, 44, 46, 47 will deactivate each respective light source. Switches 42, 44, 46, 47 can be color coded to designate the light or lights activated by the respective button. For example, switch 44 may be colored yellow to designate control of yellow light strip 26. Switch 42 may be colored white to designate control of the white directional spotlight 27. Button 46 may be colored blue and red to designate control of the blue and red flashing warning lights 16, 18.

Figure 7:
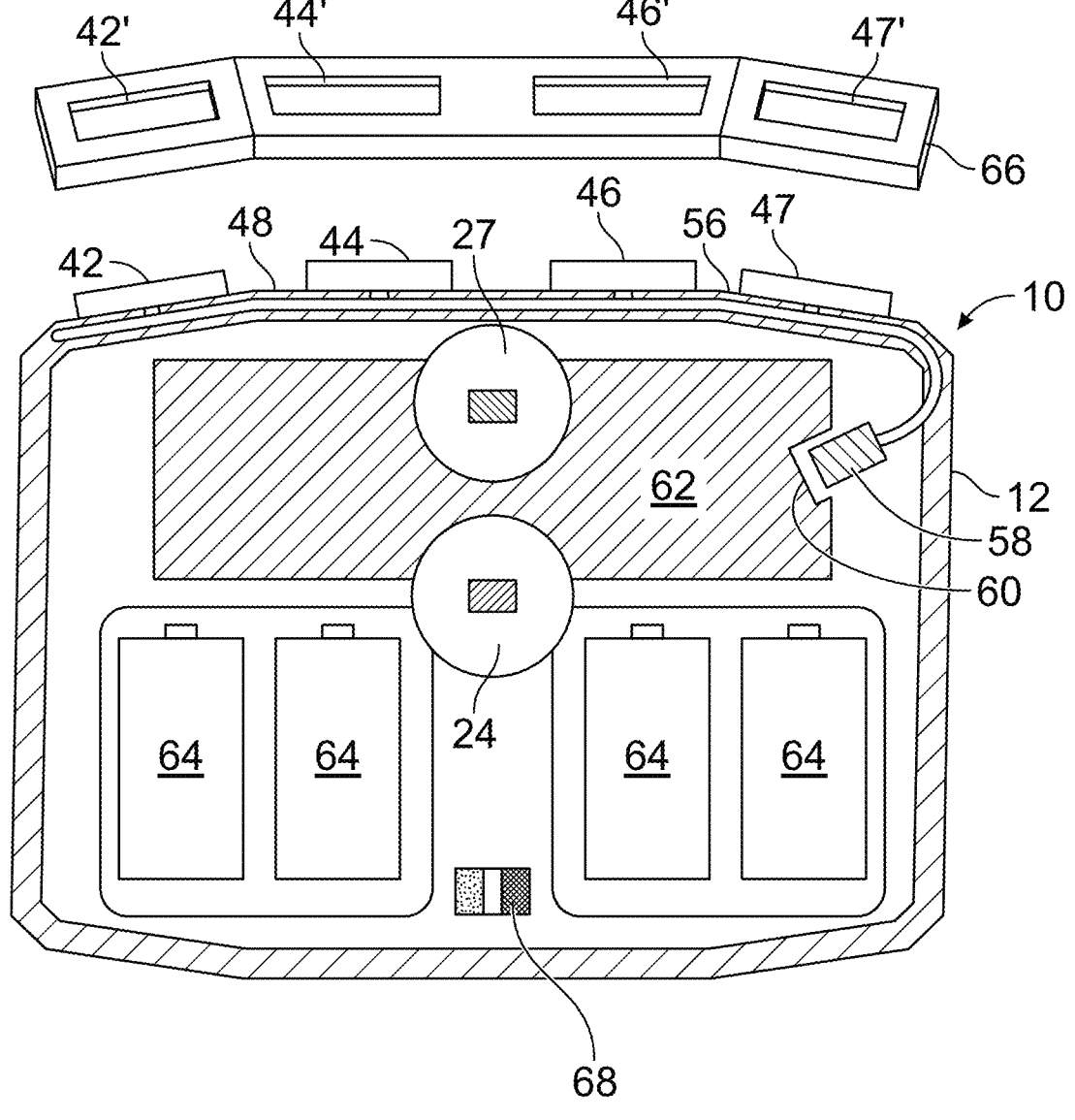
FIG. 7 is a schematic internal partially exploded view of the elements of FIGS. 1-4 disposed inside and on the housing of the device.

Referring to FIG. 7, switches 42, 44, 46, 47 are each mounted on a membrane switch pad strip 56, where switch pad strip 56 comprises a plug 58 adapted to be removably inserted into a receptacle 60 in PC board 62. PC board 62 is powered by an array of multiple batteries 64 in this embodiment. Switch pad strip 56, in the illustrated embodiment, is covered by a switch bezel 66 having raised pockets 42', 44', 46', 47' into which switches 42, 44, 46, 47, extend, respectively, to prevent foreign subject matter from getting into switches 42, 44, 46, 47.

Referring to FIG. 7, high intensity light 24, spotlight beam 27 and an LED light source 68 are each electrically connected to PC board 62 and battery array 64. LED light source 68 is used to backlight badging insert 34 (FIG. 1), as explained previously.

Figure 8:
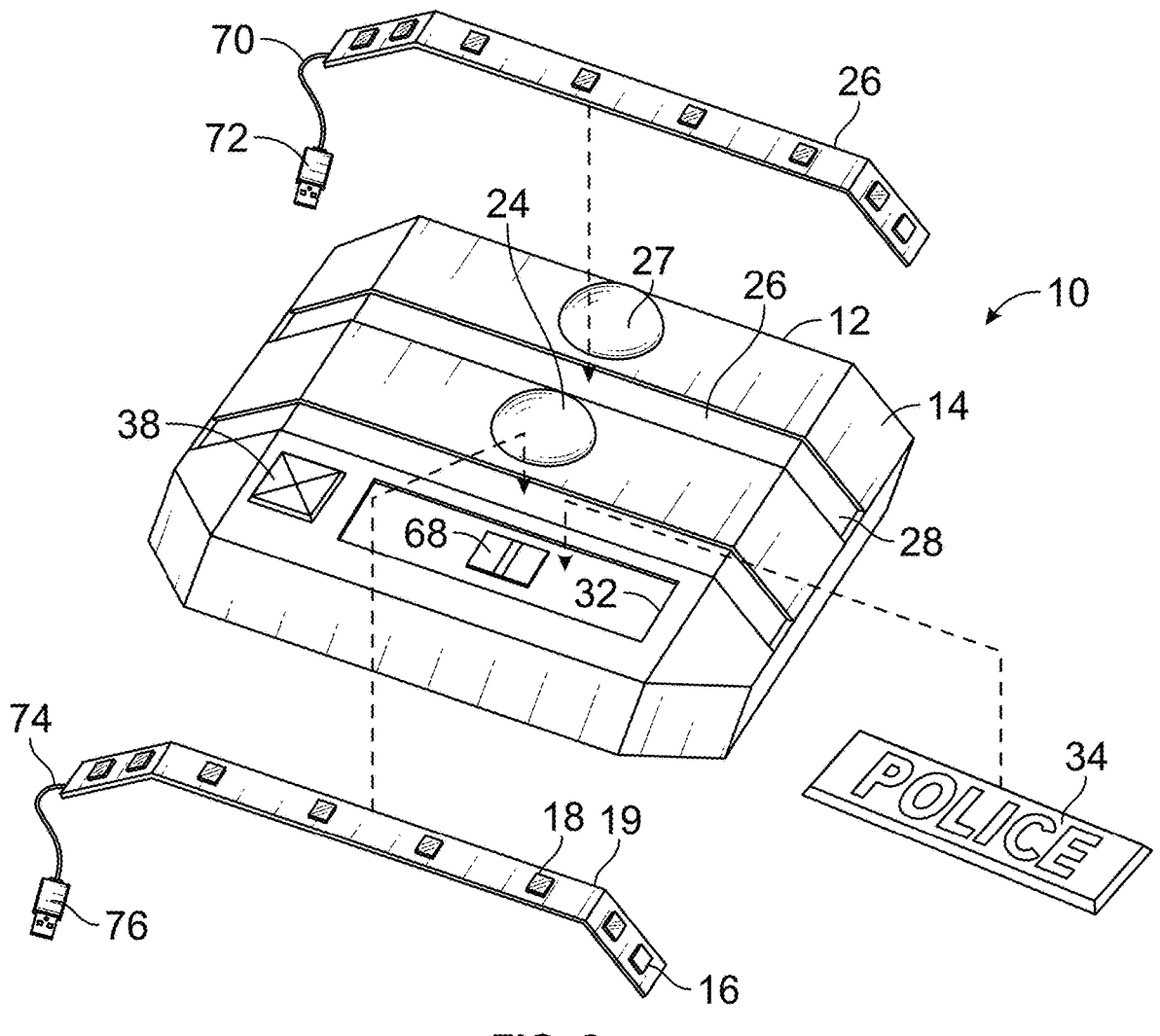
FIG. 8 is a schematic partially exploded top side perspective view of the embodiments of FIGS. 1-4.

Referring to FIG. 8, yellow light strip 26 is mounted in groove 28 (FIG. 1), and yellow light strip 26 has an electric wire 70 extending from each light on strip 26 to an electrical connector plug 72. Plug 72 is received in a receptacle (not shown) on PC board 62 (FIG. 7) to transmit electrical power from battery array 64 to the lights embedded in yellow light strip 26. Similarly, warning light strip 19 includes an electric wire 74 attached at one end to the warning lights 16, 18 embedded in strip 19, and to a plug 76 adapted to be inserted into an electrical receptacle of PC board 62 (FIG. 7).

As also illustrated in FIG. 8, when badging insert 34 is inserted in groove 32, and switch 38 (FIG. 1) is activated, LED light source 68 is activated, illuminating integers 36 to identify the public safety agency or organization represented by the patrol officer.

Figure 10:
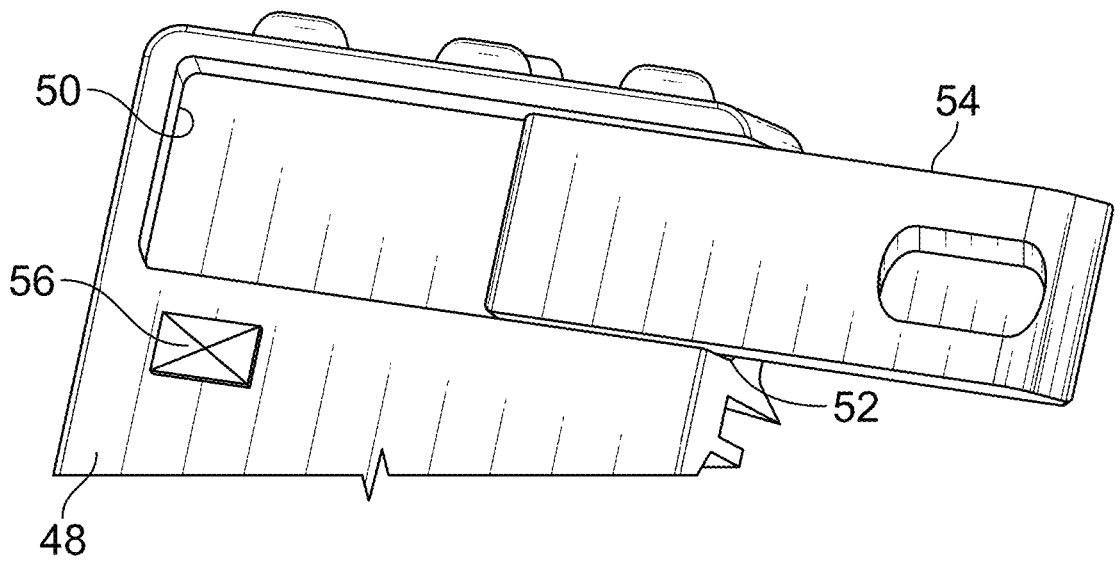
FIG. 10 is a detail view of an embodiment of the present invention incorporating an outside mounted replaceable battery power source in place of internally disposed dry cell batteries.

Referring to FIG. 10, in a further embodiment, the rear 48 of housing 12 includes a groove 50 open at one end 52. Replaceable battery 54 is removably inserted into groove 50 to provide electric power to the device 10 and each of its features. A spring loaded battery release button 56 controls the release of battery 54 when replacement of the battery is required.

Figure 3:
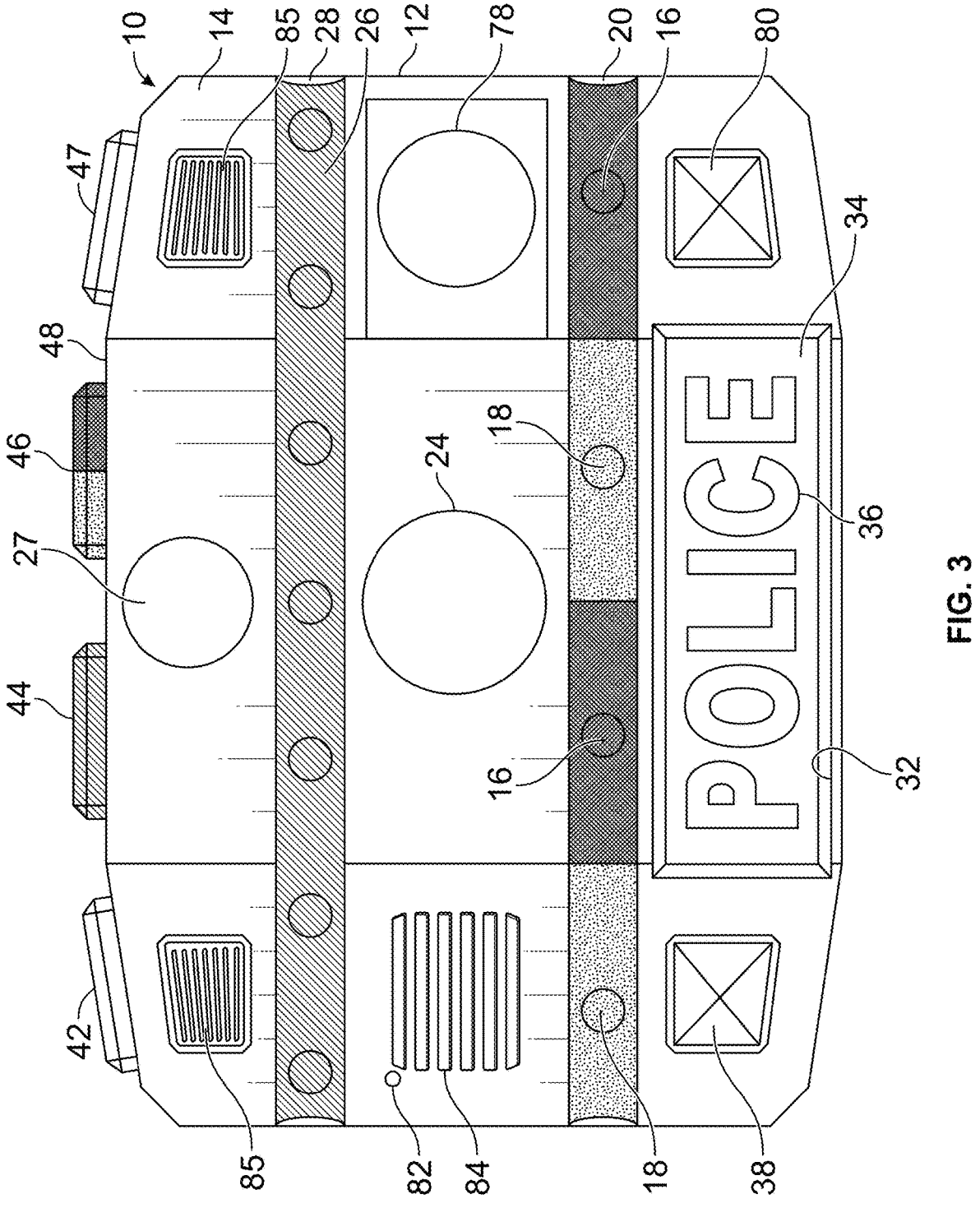
FIG. 3 is a top front elevation view of a second embodiment of the device illustrated in FIG. 1.

In the embodiment of the present invention illustrated in FIGS. 3 and 4, a body cam camera 78 is mounted on front plate 14 and suitably electrically connected to batteries 64 for power. Body cam camera 78 is capable of recording video and audio signals adjacent the wearer when activated by on/off switch 80. The embodiment of FIG. 3 also comprises a communications microphone 82 and a speaker 84. A cable wired or radio frequency (such as Bluetooth®) module (not shown) provides the wearer with full duplex communications for a two-way radio, cellular or satellite phone. Mounted on front plate 14 are a pair of push-to-talk switches 85 for manual operation of microphone 82 by the wearer.

Illustrated in FIG. 4 is a night vision sensor 86 mounted on front plate 14 of housing 12. Night vision sensor 86 comprises a receiving lens 88 and a projected infrared or daylight sensor scope (not shown) capable of providing night vision or thermal imaging during ambient darkness at night. Night vision sensor 86 could also be mounted on the embodiment of the invention illustrated in FIG. 5. The housing 90 of the embodiment of the invention illustrated in FIG. 5 could also support a pressurized container of pepper spray or mace (not shown) adapted to spray pepper or mace into the face of a bad actor by use of a manual trigger or electric switch forward or backward of the worn device 10.

The device of the various embodiments, illustrated and described herein could also include a manually operable siren alert (not shown) providing an audible warning siren tone to assist with vehicle traffic or pedestrian movement. A control button for the siren alert can be located on a side panel of housing 12.

Referring to FIG. 1, the light cast by letters 36 of badging insert 34 projects a low intensity light that can be used as a map light.

Figure 5:
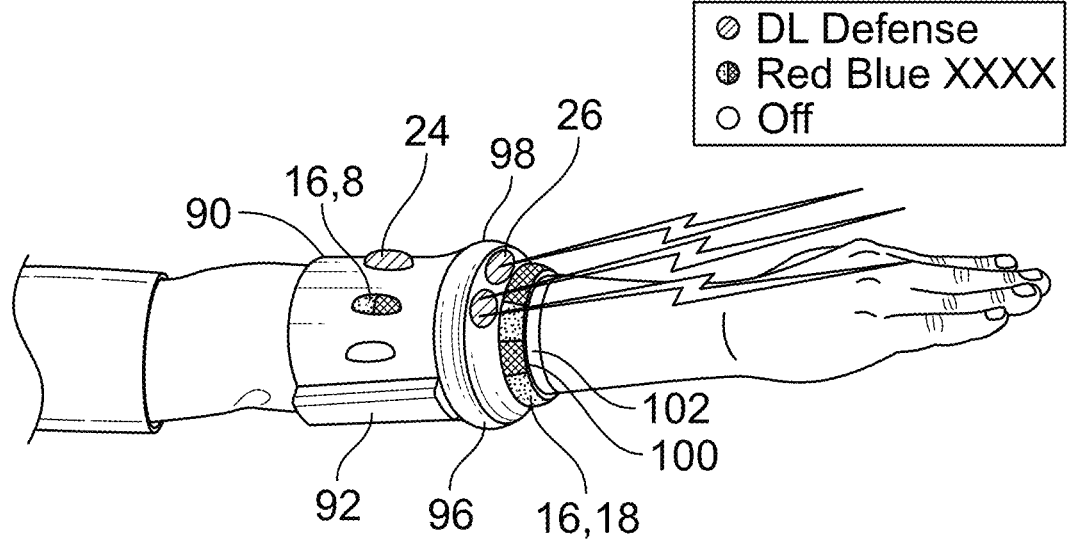
FIG. 5 is a perspective view of a third embodiment of the present invention shown worn on the lower arm of a law enforcement officer.

FIG. 5 illustrates an embodiment of the present invention that can be worn on the lower arm or over the wrist of the wearer. In this embodiment, housing 90 made, for example, of stretch neoprene with a hook-and-loop fastener 92 is adapted to be mounted over the arm or wrist of the wearer. Mounted on housing 90 are high intensity light 24 and red/blue warning lights 16, 18. An on/off switch 94 has several positions to control the activation of lights 24, 16 and 18. A user shroud 96 extends outwardly from the forward end 98 of housing 90. A strip 26 of flashing yellow lights, such as LED lights, is mounted on a forward facing surface of housing 90 or user shroud 96. A strip 100 of constantly on or flashing red and blue warning lights 16, 18 are mounted on an outer surface 102 of housing 90. Each of the lights mounted on housing 90 and shroud 96 are suitably attached to a power source and to controls for activating each light (not shown).

Figure 6:
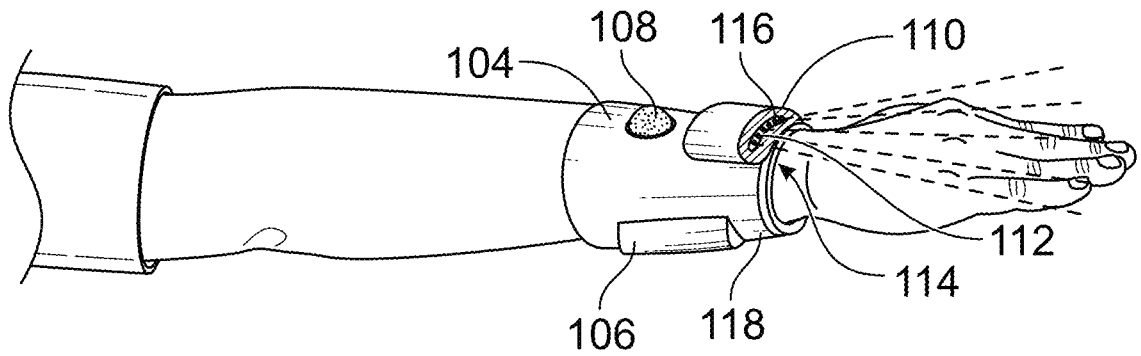
FIG. 6 is a perspective view of a further embodiment of the device illustrated in FIG. 5, shown worn on the lower arm or wrist of a law enforcement officer.

FIG. 6 illustrates an alternate version of the embodiment of FIG. 5, wherein housing 104 is made of a breathable mesh and a hook-and-loop fastener. A rechargeable battery 106 is replaceably attached to a portion of the surface of housing 104. An activation switch 108 is also mounted on an outer surface of housing 104. A light housing 110 is also mounted on housing 104, the light housing including a spot flashlight 112 and high intensity defense light source 114 adapted to project light out of forward facing opening 116 in housing 104. Mounted to housing 104 is a low intensity tactical red map light 118. The embodiment of FIG. 6 provides the patrol officer with a hands-fee flashlight and a defensive high intensity light burst.

While the present disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

We claim:

1. A wearable law enforcement patrol light and signal device, comprising:
   a. a housing adapted to be worn by a law enforcement patrol officer;
   b. a source of electric power supported by the housing;
   c. a high intensity light source mounted in a front plate of the housing, the high intensity light source electrically connected to the source of electric power;
   d. a first manually operated switch electrically connected to said power source and to said high intensity light source, said first switch configured to activate and deactivate said high intensity light source;
   e. said high intensity light source emitting an alternating burst of light in the range of at least five thousand lumens outward from the front plate when the high intensity light source is activated;
   f. a laser enabled light source electrically connected to said source of electric power, said laser enabled light source mounted on the front plate of the housing;
   g. said laser enabled light source electrically connected to said source of electric power;
   h. a second manually operated switch electrically connected to said power source and to said laser enabled light source, said second switch configured to activate and deactivate said laser enabled light source;
   i. said laser enabled light source emitting a light beam at least one mile from the front plate of the housing.

2. A wearable law enforcement patrol light and signal device of claim 1, comprising:
   a. a housing adapted to be worn by a law enforcement patrol officer;
   b. a source of electric power supported by the housing;
   c. a high intensity light source mounted in a front plate of the housing, the high intensity light source electrically connected to the source of electric power;
   d. a first manually operated switch electrically connected to said power source and to said high intensity light source, said first switch configured to activate and deactivate said high intensity light source;
   e. said high intensity light source emitting an alternating burst of light in the range of at least five thousand lumens outward from the front plate when the high intensity light source is activated;
   at least one pair of different colored warning lights mounted on the front plate of the housing, said at least one pair of warning lights electrically connected to said source of electric power and to a third manually operable switch electrically connected to said power source and to said at least one pair of different colored warning lights,
   said third switch configured to activate and deactivate said at least one pair of different colored warning lights,
   said at least one pair of different colored warning lights flashing in motion sequences when activated by said third switch.

3. A wearable law enforcement patrol light and signal device, comprising:
   A wearable law enforcement patrol light and signal device, comprising:
   a. a housing adapted to be worn by a law enforcement patrol officer;
   b. a source of electric power supported by the housing;
   c. a high intensity light source mounted in a front plate of the housing, the high intensity light source electrically connected to the source of electric power;
   d. a first manually operated switch electrically connected to said power source and to said high intensity light source, said first switch configured to activate and deactivate said high intensity light source;
   e. said high intensity light source emitting an alternating burst of light in the range of at least five thousand lumens outward from the front plate when the high intensity light source is activated;
   at least one light strip mounted on said front plate, said light strip electrically connected to said source of electric power and to a fourth manually operable switch, said manually operable switch electrically connected to said power source and to said at least one light strip;
   said at least one light strip including at least two light sources flashing in motion sequences when activated by said fourth manually operable switch.

4. A wearable law enforcement patrol light and signal device, comprising:
   a. a housing adapted to be worn by a law enforcement patrol officer;
   b. a source of electric power supported by the housing;
   c. a high intensity light source mounted in a front plate of the housing, the high intensity light source electrically connected to the source of electric power;
   d. a first manually operated switch electrically connected to said power source and to said high intensity light source, said first switch configured to activate and deactivate said high intensity light source;
   e. said high intensity light source emitting an alternating burst of light in the range of at least five thousand lumens outward from the front plate when the high intensity light source is activated;
   said at least two light sources are yellow lights.

5. The wearable law enforcement patrol light and signal device of claim 2, comprising:
   a back-lit organization identification badging insert removably mounted on said front plate;
   said identification badging comprising translucent alpha-numeric integers.

6. The wearable law enforcement patrol light and signal device of claim 5, further comprising:

an on-off switch disposed beneath said identification badging insert, said on-off switch activated upon depression of said identification badging insert in a direction toward said front plate;

said depression of said on-off switch activating said high intensity light source.

7. The wearable law enforcement patrol light and signal device of claim 1, wherein:

said housing and said front plate are composed of one of bulletproof mesh material and a bulletproof metal resin material.

8. The wearable law enforcement patrol light and signal device of claim 7, wherein:

said housing is adapted to be mounted on a bulletproof vest, the bulletproof vest comprising a front and back fabric comprised of one of a bulletproof mesh material and a bulletproof metal resin material.

9. The wearable law enforcement patrol light and signal device of claim 1, further comprising:

a communication system in said housing and on said front plate;

said communication system including a microphone and a speaker;

said communication system comprising one of a cable wired and radio frequency module providing full duplex communications for the wearer of the device.

10. The wearable law enforcement patrol light and signal device of claim 1, wherein:

the source of electric power supported by the housing includes a groove in the housing:

a replaceable and rechargeable battery removably inserted into said groove.

11. The wearable law enforcement patrol light and signal device of claim 1 further comprising:

a body camera mounted in said front plate of said housing;

said body camera recording video and audio signals adjacent the wearer when activated.

12. The wearable law enforcement patrol light and signal device of claim 1, further comprising:

a night vision sensor mounted on said front plate;

said night vision sensor including a receiving lens and one of an infrared and daylight sensor scope.

13. The wearable law enforcement patrol light and signal device of claim 1, further including:

a pressurized container of one of pepper spray and mace mounted on said housing;

said pressurized container activated by one of a manual trigger and an electric switch.

14. The wearable law enforcement patrol light and signal device of claim 1, further comprising:

a manually operable siren alert.

15. A wearable law enforcement patrol light and signal device comprising:

a. a housing adapted to be worn by a law enforcement patrol officer;

b. a source of electric power supported by the housing;

c. a high intensity light source mounted in a front plate of the housing, the high intensity light source electrically connected to the source of electric power;

d. a first manually operated switch electrically connected to said power source and to said high intensity light source, said first switch configured to activate and deactivate said high intensity light source;

e. said high intensity light source emitting an alternating burst of light in the range of at least five thousand lumens outward from the front plate when the high intensity light source is activated;

f. a laser enabled light source electrically connected to said source of electric power, said laser enabled light source mounted on the front plate of the housing;

g. said laser enabled light source electrically connected to said source of electric power;

h. a second manually operated switch electrically connected to said power source and to said laser enabled light source, said second switch configured to activate and deactivate said laser enabled light source;

i. said laser enabled light source emitting a light beam at least one mile from the front plate of the housing;

a manually operable dimmer switch pivotally mounted to said housing;

said dimmer switch, when rotated, lowering the intensity of light sources of said device.

16. A wearable law enforcement patrol light and signal device to be worn by a law enforcement patrol officer, the device being a kit comprising:

a housing adapted to be worn by a law enforcement officer;

a front plate mounted on said housing;

a high intensity light source in the range of 5000 lumens and greater supported by said housing, said high intensity light source electrically connected to said source of electric power;

a laser enabled light source supported by said housing, said laser enabled light source electrically connected to said source of electric power;

at least one pair of different colored warning lights supported by said housing, said at least one pair of different colored warning lights electrically connected to said source of electric power;

at least one light strip of yellow lights supported by said housing, said yellow lights electrically connected to said source of electric power, said yellow lights flashing in motion sequences when activated;

a back-lit organization identification badging insert removably mounted on said housing, said identification badging insert comprising translucent alphanumeric integers;

an on-off switch disposed beneath said identification badging insert, said on-off switch activating and deactivating said high intensity light source;

said housing and said front plate composed of one of bulletproof mesh material and a metal resin material;

a communication system including a microphone and a speaker in said housing;

a body camera mounted in said front plate of said housing, said body camera recording video and audio signals adjacent the law enforcement officer;

a night vision sensor mounted on said front plate;

a siren alert supported by said housing; and a manually operable dimmer switch pivotally mounted to said housing, said dimmer switch, when rotated, lowering the intensity of light sources of said device.

17. The wearable law enforcement patrol light and signal device of claim 1, wherein:

said housing is composed of a flexible material, said housing adapted to be worn over one of an arm and a wrist of a patrol officer;

said housing supporting said high intensity light source;

said housing further supporting a plurality of different colored warning lights;

said housing further supporting a plurality of flashing yellow lights.

18. The wearable law enforcement patrol light and signal device of claim 17, wherein said flexible housing comprises one of stretch neoprene and a breathable mesh.

* * * * *